(12) United States Patent
Henningsen

(10) Patent No.: US 6,529,265 B1
(45) Date of Patent: Mar. 4, 2003

(54) ILLUMINATION UNIT AND A METHOD FOR POINT ILLUMINATION OF A MEDIUM

(75) Inventor: Henning Henningsen, Låsby (DK)

(73) Assignee: Dicon A/S, Lystrup (DK)

( * ) Notice: Subject to any disclaimer, the term of this patent is extended or adjusted under 35 U.S.C. 154(b) by 0 days.

(21) Appl. No.: 09/402,754

(22) PCT Filed: Apr. 14, 1998

(86) PCT No.: PCT/DK98/00155

§ 371 (c)(1),
(2), (4) Date: Oct. 12, 1999

(87) PCT Pub. No.: WO98/47048

PCT Pub. Date: Oct. 22, 1998

(30) Foreign Application Priority Data

Apr. 14, 1997 (DK) ................................................ 415/97
Jan. 16, 1998 (DK) ................................................. 63/98

(51) Int. Cl.⁷ ......................... G03B 27/72; G03B 27/46;
              G03B 27/42; G03B 27/32; A61N 5/00
(52) U.S. Cl. ........................... 355/71; 355/34; 355/35;
                                   355/67; 355/53; 355/77; 250/492.2
(58) Field of Search ............................... 355/34, 35, 67,
                                        355/71, 77, 53; 250/492.2

(56) References Cited

U.S. PATENT DOCUMENTS

| | | | | |
|---|---|---|---|---|
| 4,724,465 A | * | 2/1988 | Davies | 355/53 |
| 5,005,043 A | * | 4/1991 | Kobayashi et al. | 355/27 |
| 5,227,839 A | * | 7/1993 | Allen | 355/53 |
| 5,337,097 A | * | 8/1994 | Suzuki et al. | 353/101 |

* cited by examiner

Primary Examiner—Russell Adams
Assistant Examiner—Khaled Brown
(74) Attorney, Agent, or Firm—Finnegan, Henderson, Farabow, Garrett & Dunner, L.L.P.

(57) ABSTRACT

The invention is an illumination unit for point illumination of a medium where at least one light emitter is arranged to illuminate at least one illumination face via a first lens arrangement and a microshutter arrangement. The lens arrangement has at least one microlens arranged with respect to each microshutter so that light emitted from the light emitter is focused on or in the vicinity of the optical axis of the light channel of the individual microshutters. The fed coherent light from the light emitters is modulated by the microshutters onto the illumination face.

21 Claims, 6 Drawing Sheets

95  97  96  97         95

Figure 1:
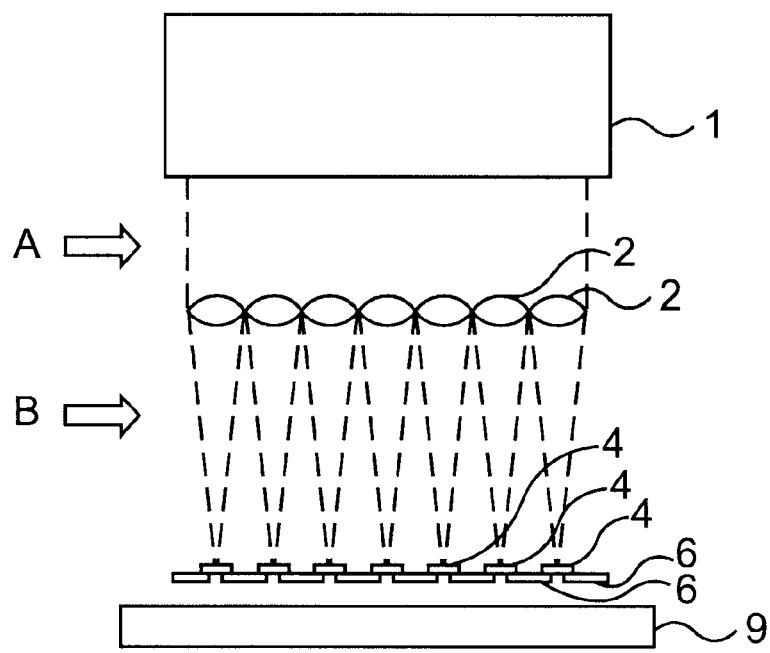

A' ⇒
B' ⇒
C' ⇒           99
D' ⇒           98
               99'
               94

100  101  101  102  102

ILLUMINATION UNIT AND A METHOD FOR POINT ILLUMINATION OF A MEDIUM

FIELD OF THE INVENTION

The invention relates to an illumination unit for point illumination of a medium where at least one light emitter is arranged to illuminate at least one illumination face via a microshutter arrangement, and to a method of point illumination of a medium by means of at least one light emitter arranged to illuminate at least one illumination face via a microshutter arrangement.

This takes place in a print-down frame under vacuum to ensure close contact between film and printing plate. The film, whose photo emulsion is sensitive in a given range, e.g. 350–450 nm, is illuminated through the film by a powerful lamp, such as e.g. a xenon or mercury lamp, whereby the image from the film is transferred to the printing plate.

The image on the film used has typically been produced in that a laser beam has drawn the image on the film in an image setter. The laser beam is turned on and off by means of a modulator which is controlled by digital information.

Thus two main process steps are involved: film manufacture and plate copying.

It is evident that both time and money may be saved by skipping the film manufacture and directly illuminating the image on the plate on the basis of the digital information. This solution would be particularly advantageous if it was possible to expose conventional commercially attractive printing plates.

However, it is problematic to obtain digitally controlled illumination sources or more particularly laser sources which are capable of illuminating the conventional printing plates at the correct wavelength and with sufficient optical power. This problem is particularly pronounced in the UV region and the blue region in the 350–450 nm range.

One way of obviating these circumstances may e.g. be to develop particularly highly sensitive plates which can be exposed by lasers at greater wavelengths. This technique is used today in so-called CtP machines (Computer-to-Plate Image Setters). However, these printing plates are expensive to obtain, just as these highly sensitive printing plates must be handled in consideration of the fact that they are exposed in daylight. Thus, it would be an advantage in several respects if it was possible to achieve sufficient illumination of more commercially attractive printing plates with lower sensitivity, which may be achieved by increasing the light intensity on the printing plate itself.

This solution, however, will give new problems, since the only commercially available light sources like those mentioned above do not provide sufficient optical power at the necessary wavelengths.

This problem may be obviated by using e.g. short arc lamps which can emit a greater optical power.

This technical solution, however, involves further complications, as a lamp cannot be modulated in the same manner as the known lasers, which may be solved, however, by a purely mechanical modulation of the light source.

The present applicant's European Patents EP 0 642 423 and EP 0 643 645 disclose applications of the above-mentioned type, wherein a film or a printing plate is illuminated directly through so-called microshutters by a so-called direct exposure. However, these applications with increased illumination resolution requirements will be relatively complicated and expensive in their structure, since each microshutter is illuminated by an associated light source in the form of an optical fibre and associated optics. In case of great illumination resolutions, these thus involve a very high complexity and the necessity of a very large number of optical fibres, which each have to be calibrated for the application concerned. In case of illumination systems of the above-mentioned type, the optical fibres will thus restrict the possible resolution in practice, just as the optical losses will be a limiting factor for the complete system, since utilization of this proximity exposure requires that the individual pinholes are illuminated evenly over the entire hole surface on the inlet side. If the light is merely conducted down toward the individual pinholes from e.g. a collimation lens, there will be a very great loss of light which falls outside the pinhole. If the light is focused down into the hole, e.g. by means of a microlens, the intensity profile of the light at the inlet to the hole will not be even, but resemble a Gauss curve, and only a small part of the beam can therefore be used to achieve an even illumination.

The object of the invention is thus at first to achieve a modulator type which may be used in. an illumination system for efficient and economic illumination of conventional printing plates requiring a relatively high illumination intensity.

SUMMARY OF THE INVENTION

When, as stated in claim 1, at least one of the light emitters of the illumination unit is arranged to illuminate at least two microshutters via a first lens arrangement, said lens arrangement comprising at least one microlens arranged with respect to each microshutter so that the light emitted by the light emitter is focused in or in the vicinity of the optical axis of the light channel of the individual microshutters, an apparatus extremely suitable for illuminating photosensitive media with a lower optical sensitivity is achieved.

Light from the light emitter or one of the light emitters is thus focused in the individual microshutters, which can thus modulate the fed coherent light on an illumination place.

It has thus been found that when using commercially available plates sufficient "optical energy" or intensity may be provided from one light emitter to several microshutters at the same time. Thus, according to the invention it will be sufficient to subdivide the microshutters used into smaller groups.

This is achieved partly by the circumstance that it has been found to be mechanically possible to distribute a collimated light beam by subdividing this light beam into several light beams and focusing these in their respective microshutters by means of the first arrangement of microlenses in accordance with the invention. Further, it has been found that this distribution involves remarkably small optical losses, even though considerable optical losses might be feared by this division.

Within the scope of the invention, the microlens arrangements may be constructed in several different ways. An example of a variation within the scope of the invention might be a multilayer line arrangement.

It should be noted that power optimization in accordance with the invention may be achieved by focusing the entire or most of the light beam through the associated light channels without regard to a requirement for a flat intensity profile in the inlet of the entire light channel. A minimum or reduced power waste between the shutter apertures may thus be achieved by suitable focusing.

According to the invention, it is also possible to illuminate several shutters by a light emitter in the form of e.g. an optical fibre end.

As the illumination of a medium thus takes place in parallel using one or relatively few light emitters, this division makes it possible to achieve and maintain a high illumination intensity at the individual illumination points at a very high illumination rate.

Thus, reproducible illumination of a medium is possible on the basis of stored digital data by high rate exposure, as a high illumination intensity allows the opening times of the individual microshutters to be reduced, which, however, also requires a reduced rise/fall time. A reasonable structure of the micromechanical shutters enables a rise/fall time to be achieved which is so small that the shutter arrangement according to the invention may be used also when the overall system involves a relative movement between the illumination area and the illumination arrangement, which may e.g. be the case in connection with a scanning over an illumination area. A small rise/fall time will thus cause the illumination spot to approach its ideal shape.

According to the invention, a particularly advantageous embodiment of a microshutter will be achieved by a hole which forms a light channel through which light may be transmitted without dimming and without reflection through the use of e.g. mirrors, and where the aperture may be mechanically blocked and opened for transmission by means of an electrically activatable mechanical diaphragm. The dimming in the light channel itself will ideally be zero.

One of several distinct advantages of using the micromechanical shutters is that these may transmit a relatively great light energy to the illumination area over a short time interval, and accordingly, in connection with the relative movement between shutter arrangement and illumination area described above less allowance is to be made for the circumstance that a given point on the illumination area is to receive a specific amount of light before the desired illuminated result is achieved. For example, greater allowance would have to be made if the same point was to be illuminated several times to achieve correct exposure. The invention also enables rapid and strong illumination of individual illumination points, even if the illumination is performed e.g. by scanning, just as it is possible to increase the rate of the scanning movement.

Examples of photo-sensitive media may e.g. be printing plates, films, printed circuit boards (PCB), etc.

It is noted that the invention effectively enables simultaneous parallel modulation over a larger area at a very high illumination intensity.

According to the present invention it is likewise possible to achieve a very high on/off ratio, i.e. the ratio of how much light passes through a microshutter in the open state and the closed state, respectively.

The shape of the light channel may be adapted to the individual applications by suitable variation of e.g. cross-section.

Further, the invention allows a digital proof to be made, e.g. performance of correction, on the same machine as exposes printing plates. Production of a proof which is identical with the image on the printed paper is not possible with the traditional proofing methods without first having to expose a film, as is the case e.g. with the recognized proofing methods such as Cromalin and Matchprint.

Thus, according to the invention it is possible to make an identical image on both proof paper and printing paper, and it will therefore be possible to obtain a proof which is in extremely good register with the finished print.

This means e.g. that the invention provides a possibility of predicting moiré problems in the print, the reason being that it is possible according to the invention to modulate UV light directly and thereby generate the same raster dots on the traditional UV sensitive proof materials as in the finished print.

An illumination source that may be used for performing the invention may e.g. be a UV short arc lamp. Thus, a very high illumination intensity (radiant intensity) in the 350–450 nm range may be achieved by using a mercury short arc gap lamp. A radiant intensity of above 10 W/sr may be achieved hereby, which with one lamp is enough for achieving a reasonable illumination rate for a conventional offset plate.

In an overall aspect, the invention thus enables modulation at a very high illumination intensity and at very small wavelengths, for which reason conventional inexpensive printing plates may be achieved.

Another and very essential aspect of the invention and the use of the mentioned printing plates is that the lower light sensitivity also mentioned before is a great advantage in connection with both storage and handling, since these, in contrast to highly sensitive printing plates, can tolerate daylight for a certain period without being exposed.

It will be appreciated that the invention can not only be used for exposing films and printing plates, but may advantageously be used for illuminating other types of light-sensitive materials in totally different fields of use.

When, as stated in claim 2, the illumination unit additionally comprises a second microlens arrangement arranged between the microshutters and the illumination face, so that light transmitted through the light channel of. the individual microshutter is suitably focused on the illumination face, an advantageous illumination on the illumination face is achieved, as the light modulated through the shutters may be focused on the illumination face to the light spot, whose shape and extent are provided by the dimensioning and the structure of the optical system.

Since the intensity profile of the individual beams in the shutter aperture is non-uniform, the utilization of the optical energy is improved by using the second microlens arrangement. This applies in particular in connection with light channels having a small diameter (pinholes). The use of focusing optics on the outlet side of the microshutters thus provides a significant increase in efficiency, as the edge area of the beam profile is likewise focused toward the illumination point.

When, as stated in claim 3, at least one of the light emitters is formed by an optical light guide which is optically connected to at least one light source, an advantageous embodiment of the invention is achieved, since light may selectively by conducted to the microshutter arrangements concerned in an easy manner with reduced optical losses.

Optical guides are taken to mean optical fibres, selfoc guides, wave guides, etc.

When optical guides are used as light emitters and when these are connected optically to a light source, it is thus possible to conduct a large amount of light to the illumination place in an optimum manner. This is particularly the case if arc lamps are used as the light source, since these emit considerably less well-defined light than is the case with e.g. lasers.

It will moreover be possible to graduate the amount of light injected into each individual light guide, e.g. by using different grey filters depending on the radiated intensity profile from the arc of the light source and the desired intensity level.

When light guides, such as optical fibres, are used, the light source or sources may be positioned centrally at a distance from the modulation assembly, which facilitates service and cooling.

An additionally degree of freedom is also obtained in the positioning of one or more light sources, which facilitates design and construction. This is especially to be regarded as an advantage, recalling that the physical extent of the light sources when mounted directly above the shutters without the use of light guides makes great demands on the dimensioning of an illumination system where a relatively high exposure resolution is desired.

Considerations of space thus restrict the illumination system to a lesser degree, as it may be easier to arrange light guide ends than light sources directly above the microshutter arrangements, since fibre ends usually have a smaller extent than the light sources.

The use of light guides or optical fibres as light emitters capable of being connected optically to a light source also makes it possible to produce some very compact illumination units which may be built together to larger illumination units in a relatively simple manner, just as it is possible to build these illumination units together primarily in consideration of the physical illumination conditions that might be needed, as the critical optical transmission between the illumination source and the individual illumination points or the complete illumination place is not critical with respect to the physical position of the individual illumination units or the necessary position of the light sources in the complete illumination system.

It will likewise be possible to position the light sources at a distance from sensitive components that might be included in the structure, and the construction of the complete arrangement may therefore be simplified much, which should be seen as a particular advantage when using a large number of laser sources.

Finally, it should be noted that an optical fibre is homogenizing or "beam-cleaning" over a certain length, typically a couple of meters, and the light emitted by the light source therefore undergoes automatic correction before being conducted toward the illumination place or the illumination face and the modulation optics.

When, as stated in claim 4, the optical light guide(s) is (are) formed by optical fibres, a particularly advantageous embodiment of the invention is achieved, since optical fibres are relatively easy to handle with respect to conventional optical systems. This is pronounced in connection with relatively complicated optical systems where conventional transmission optics without light guides cannot handle a larger number of subillumination systems each having a light emitter of its own.

When, as stated in claim 5, at least one of the light sources is formed by a short arc lamp, it is possible to achieve a very high illumination intensity over a very large number of microshutters and thereby over a large illumination area, as it is possible to achieve a relatively greater power at the given desired wavelengths than it is possible to achieve by means of e.g. commercially available laser sources.

The advantage achieved is extremely pronounced when the number of illumination sources is to be restricted, as the state of the art short arc lamps have an advantage over laser sources, so that a single lamp can illuminate greater illumination faces via modulating microshutters.

For example, the desired radiant intensity in the 350–450 nm range may be achieved by using a mercury short arc gap lamp. A radiant intensity of above 10 W/sr may be achieved hereby, which with one lamp is enough to achieve a reasonable illumination rate for a conventional offset plate.

The invention thus opens up the possibility of achieving an unprecedentedly homogeneous illumination intensity over a larger area in a relatively simple manner.

When optical fibres are used for absorbing the optical power from an arc lamp, waste power because of the physical shape and structure of the light source may be avoided in a simple and optimum manner, as optical fibres may be positioned relatively freely and as needed in the light fields of the arc lamp.

Optical fibres also provide the possibility of adding the illumination intensity over the illumination area.

The fibres may e.g. also be assembled in a large fibre bundle which is positioned expediently with respect to a concentrated light beam gathered by means of a reflector in which the light source is positioned.

When, as stated in claim 6, the light source comprises a short arc lamp having light receiving optical light guides or fibres which are arranged within an angle of +/−75° with respect to the equator axis E of the lamp on a ball face around the lamp, and which are optically connected to and conduct light to the light emitters, an advantageous embodiment is achieved without the use of a reflector according to the invention, as light from a short arc lamp is received optimally in the individual fibres which may thus be arranged on a ball face having the same shape as the bulb at a distance from it.

According to an example of a concrete use, the fibre connection comprises about 150 optical fibres arranged between the short arc lamp and the microshutter array.

Thus, it appears that it is attractive according to the invention to use a lamp, e.g. a UV lamp, as the otherwise somewhat disuniform light orientation and intensity of the lamp may be absorbed and utilized by correspondingly oriented optical guides, which subsequently conduct to and illuminate the face illumination system used.

The lamp may e.g. be a mercury short arc lamp.

When a plurality of light receiving ends is distributed over the ball face of the lamp, it is also possible to adjust the light absorption in the light receiving ends of the light guides by adjusting their position with respect to the lamp and its radiation profile.

Another possible embodiment might be to construct the light source with a reflector, as mentioned above, coated with a suitable filter coating and a fibre bundle suitably oriented with respect to it. Such filtering will then normally require cooling of the reflector.

An advantage of such a collection of the light energy is that the method is very controllable and that the method can provide a homogenized input in a relatively easy manner on the light guides oriented with respect to the reflector. A further advantage of such a reflector collection and prefiltering is that mounting and service may be facilitated considerably.

When, as stated in claim 7, at least one of the light sources is formed by a laser source, an additional advantage is achieved according to the invention, as the necessary illumination power over a larger illumination area may be summed up by means of several laser sources.

Further, according to the invention, the use of laser sources involves a reduced loss of energy and thereby an increased efficiency, partly because of the possibility of reduced injection loss, and partly because of a considerably higher degree of utilization of the light source. Where a 2000 W arc lamp can typically generate a power in the desired wavelength region of 20 W in the form of modulated light points on the photo-sensitive medium, i.e. about 1%, then a diode laser with a well-defined wavelength can typically generate an order of 5% of the power.

The light from a laser source is elliptic and astigmatic, which must be corrected in the optical system. When using a fibre, the light is distributed in the fibre and the fibre emits a considerably more uniform, "mixed" beam which requires less optical correction.

When the illumination source is thus face-summed as several laser sources, it is possible to increase the illumination homogeneity over the illumination face, as the laser sources may be adjusted individually with the purpose of achieving a homogeneous illumination of the individual microshutter arrangements with simultaneous achievement of an increase in the efficiency of the complete system.

The laser sources may e.g. be of diode lasers, solid state lasers, gas lasers, liquid lasers, semiconductor lasers or the like.

When, as stated in claim 8, the activatable diaphragm devices are formed by plates which are pivotally hinged to the microshutter arrangement, an advantageous embodiment of the invention is achieved.

When, as stated in claim 9, the illumination unit comprises a light emitter in the form of alight guide optically connected to a light source and arranged to illuminate a plurality of microshutters arranged in a given face shape, at least one collimation lens being arranged between the light emitter and the face shape so that collimated light is conducted toward the plurality of microshutters by the first microlens arrangement associated with the microshutters, an advantageous subdivision of microshutter arrangements and associated optics is achieved, capable of forming part of a complete, subdivided illumination system.

It should be noted that the illumination unit may be constructed as a compact unit with microshutter, optics and integrated light guides or optical fibres, so that the unit as such may be marketed as a compact and adjusted unit which is only to be adjusted with respect to a light source used in a given application.

When, as stated in claim 10, the face shape of the microshutters forms a hexagon, a face shape of the microshutter arrangement is achieved which may be built together with and cooperate with corresponding microshutter arrangements in a simple manner.

In addition to the above-mentioned geometrical conditions in connection with corresponding microshutter arrangements, a hexagonal face shape has the advantage that it is possible to achieve a relatively great degree of filling when using a light emitter which illuminates the microshutter arrangement with a circular cross-section.

The degree of filling of a hexagonal face shape is thus about 83%, which should be seen in relation to a degree of filling of about 63% for a square face shape with respect to a circumcircle.

In addition, a hexagonal face shape has the advantage that it is possible to distribute the individual microshutters over the face shape in a simple manner so that the desired illumination distribution is achieved.

However, also many other face shapes may conceivably be implemented within the scope of the invention.

When, as stated in claim 11, the illumination unit comprises at least eight hexagons which each are illuminated by an optical fibre optically connected to an illumination source, a modular element illumination system is achieved, which can easily be built together to a desired illumination characteristic where each hexagon is fed by an illumination source via an optical fibre.

When, as stated in claim 12, the individual microshutters with associated microlens optics are positioned in rows in the transverse direction T of the face shape with the microshutters at a given mutual distance, said rows being mutually offset in the longitudinal direction of the rows, it is possible to achieve an increased illumination resolution.

When, as stated in claim 13, the rows are arranged such that the projection of all the individual microshutters on the transverse direction T in the face shape results in a plurality of illumination points at a mutual distance in the transverse direction T, an advantageous embodiment of the invention is achieved, as the face shape may advantageously be used for e.g. scanning or a similar motion illumination where an illumination resolution is smaller than the smallest possible distance between the microshutters.

When, as stated in claim 14, the first and/or the second lens arrangement is formed wholly or partly by hexagonal focal lenses, a particularly advantageous geometrical shape of the lens arrangement is achieved, as hexagonal lenses may be packed more densely than circular lenses, which additionally allows the efficiency of the system to be increased.

When, as stated in claim 15, the face shape or shapes of the microshutters are arranged on one or more illumination heads, said illumination head and said illumination face being adapted to perform a mutual relative movement across an illumination area, said device being also provided with a control unit for controlling the microshutters in dependence on the relative movement between the rod and the illumination face, an advantageous alternative to flash exposure is achieved, as the illumination unit may thus be used for illuminating larger illumination areas, just as the illumination resolution may be increased.

It will be appreciated that the relative movement between each illumination head and the illumination. area may be performed by fixing each illumination head and moving the illumination area, by fixing the illumination area and moving each illumination head, and by moving illumination head(s) as well as illumination area.

The movement across the illumination face may inter alia be arranged in dependence on the structure and shape of the movable unit. For example, a discrete illumination unit with a plurality of shutters may be moved around the illumination face by stepwise movement, whereby a given exposure may be achieved as a summing of discrete illumination faces to a total area.

When, as stated in claim 16, the movable unit is formed by a rod, the relative movement between the illumination face and the rod being a single progressing movement in the transverse direction of the rod, a particularly advantageous embodiment of the invention is achieved, since such a scanning may give a total illumination in the entire transverse direction of the illumination face, thereby avoiding boundary lines between discrete illumination zones so that the positioning uncertainty in the exposure of points transversely to the direction of movement over the total exposure is substantially reduced to the mutual positioning uncertainty between the individual microshutters of the illumination unit and uncertainty in the guidance.

When, as stated in claim 17, each individual microshutter is formed by an oscillating diaphragm element movable to and from between two positions, said oscillating diaphragm element being suspended so that elastic forces act toward an equilibrium position between the two positions, said illumination unit additionally comprising a control unit for controlling the oscillating diaphragm element by means of electrostatic forces, said diaphragm element blocking the light channel of the microshutter in one of the two positions, it is possible to achieve rapid modulation since the natural frequency of the oscillating element, as a function of the oscillation parameters of the element, such as mass, elasticity and geometry as well as internal and external forces, determines the switching time of the microshutter.

The response time of the individual microshutters to a given control signal from the control unit is thus enhanced by the natural frequency of the oscillating system, which may thus be dimensioned to the desired switching time.

Other microshutter types may e.g. be constructed without significant contributions from the above-mentioned elastic suspension, as the diaphragm element of the shutter may be pulled from position to position primarily by means of electrodes positioned all the way along the diaphragm element and its arm.

When, as stated in claim 18, the illumination unit between the microshutter arrangement and the illumination face additionally comprises optical means for spreading the light beams emitted by the light channels over the illumination face, it is possible to perform flash exposure over a larger illumination are, since the optical means for spreading the light beams emitted by the light channels ensure that the microshutter arrangement can illuminate an area which corresponds to the extent of the associated microshutter arrangement, and can also cover the blind areas inter alia between the various modular elements in the illumination system.

When the cross-section of the light channels has the greatest diameter at the lower termination of the light channel toward the illumination face, then light may be conducted in the best possible manner through the microshutter if the individual shutter plates are positioned at or above the upper termination of the light channel, it being recalled that it is typically intended to focus light from the first microlens arrangement on the shutter plate itself.

When at least one of the light channels is conical, with the largest diameter at the lower termination of the light channel toward the illumination face, an advantageous embodiment of the invention is achieved.

DRAWINGS

Figure 2:
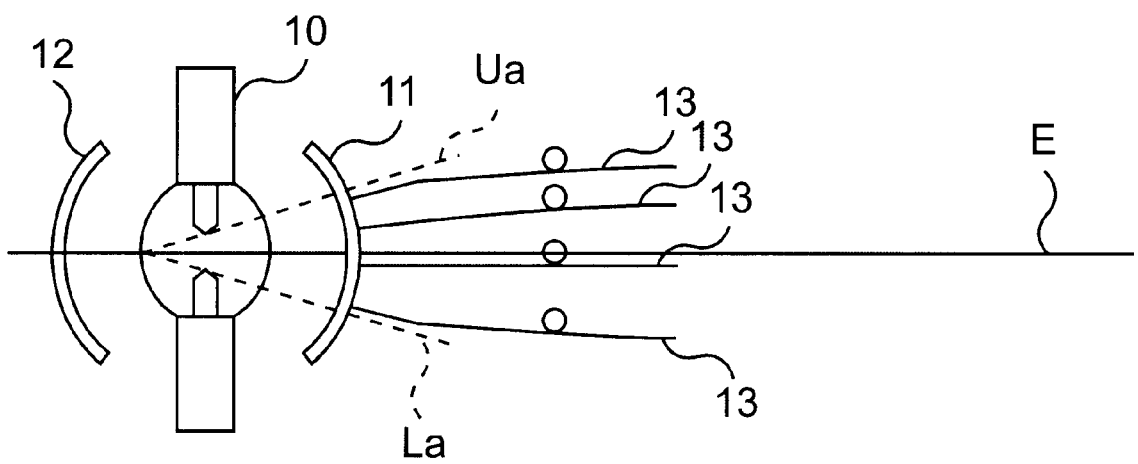
Figure 3:
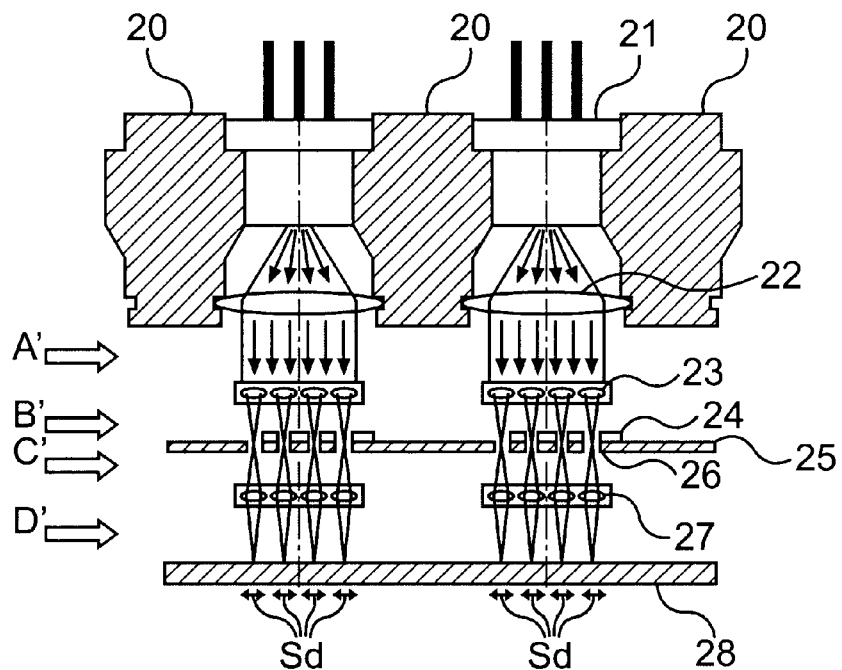
Figure 4:
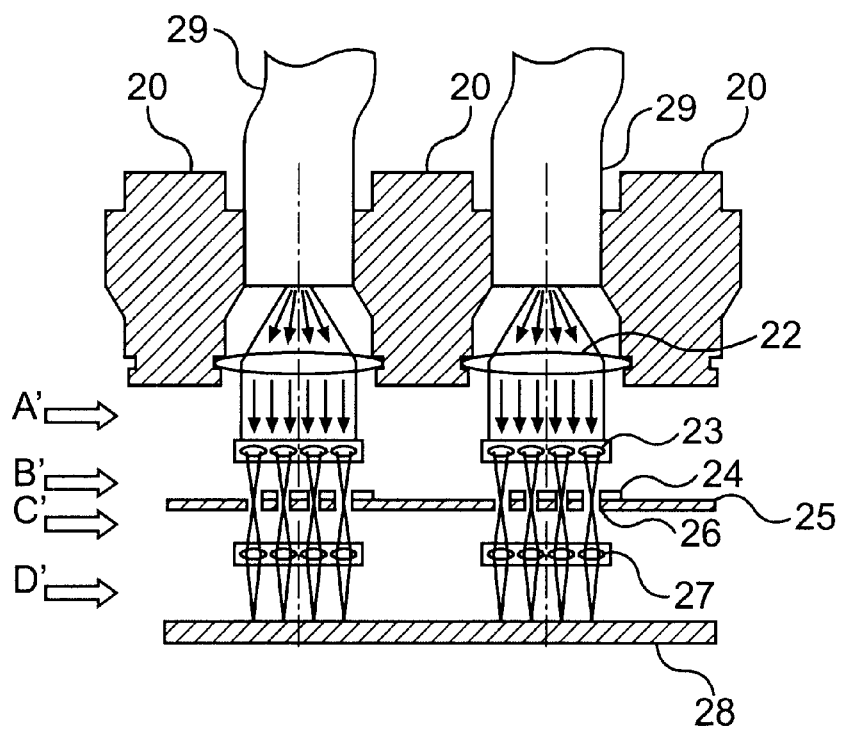
Figure 5:
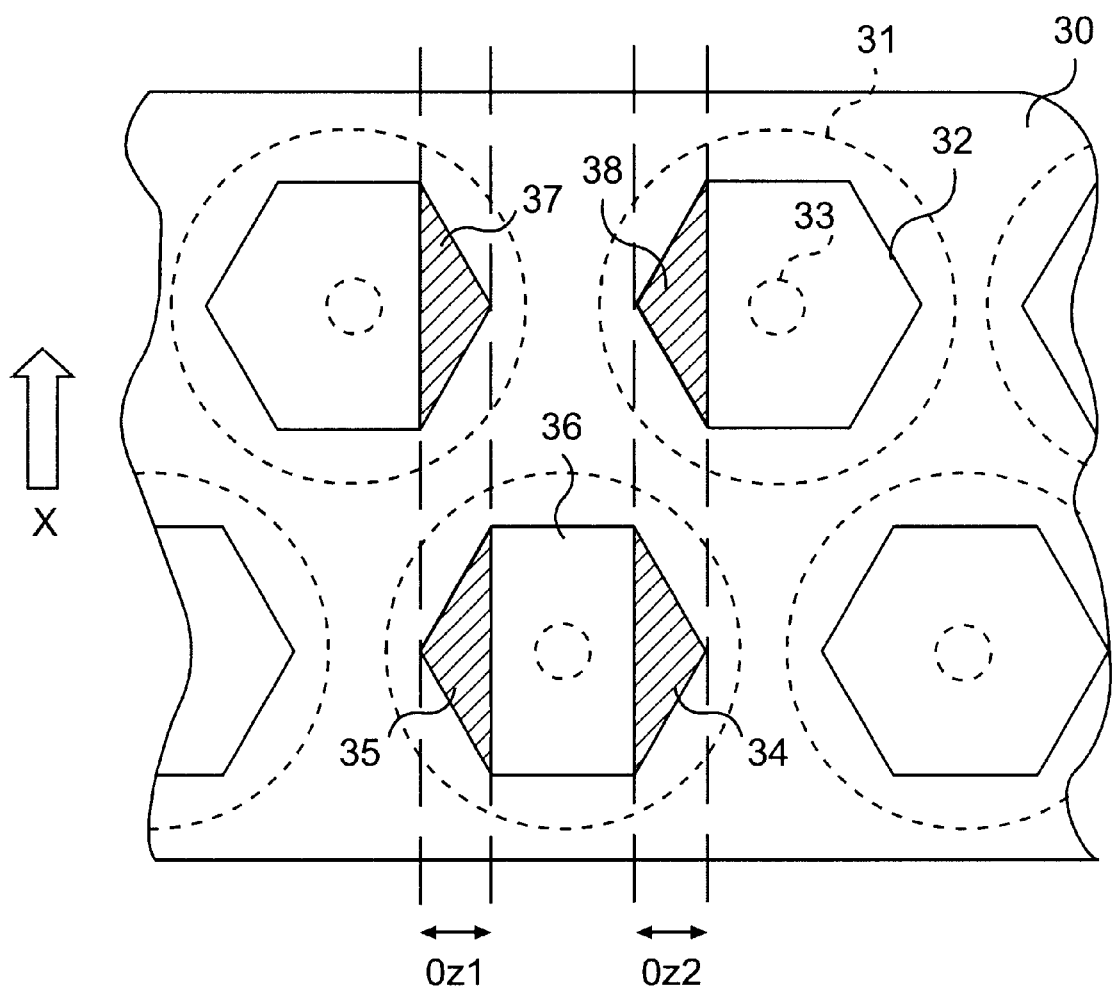
Figure 6:
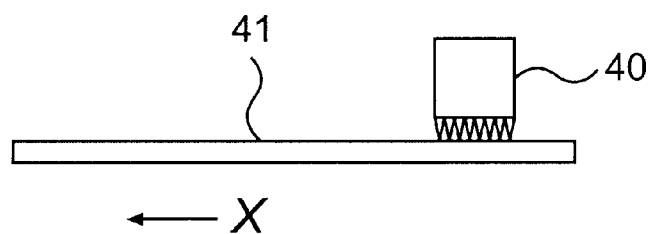
Figure 9:
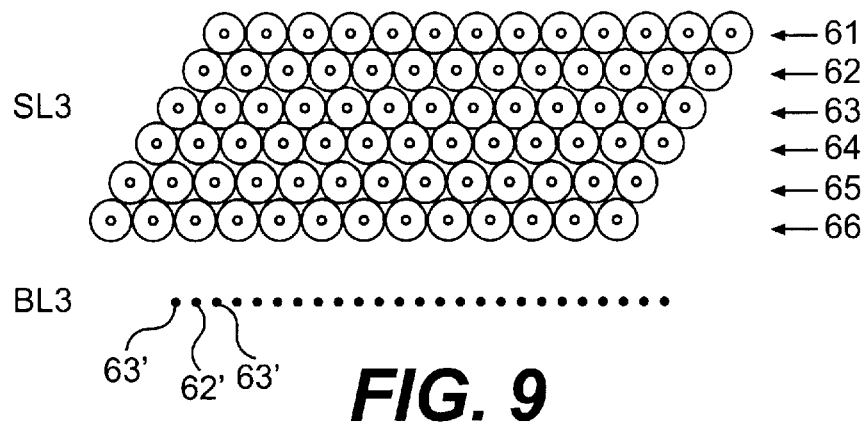
Figure 10:
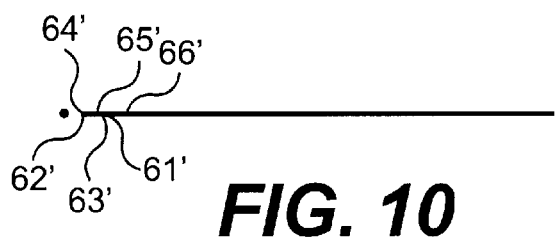
Figure 11:
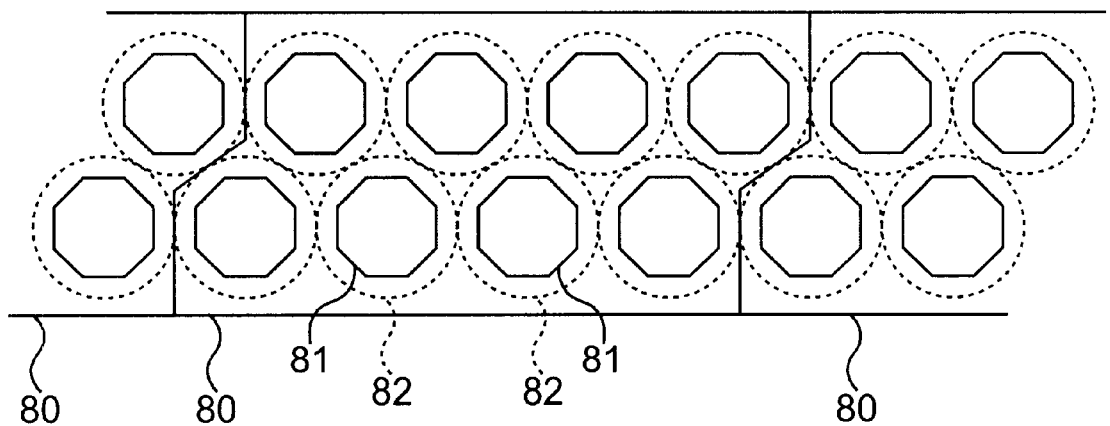
Figure 12:
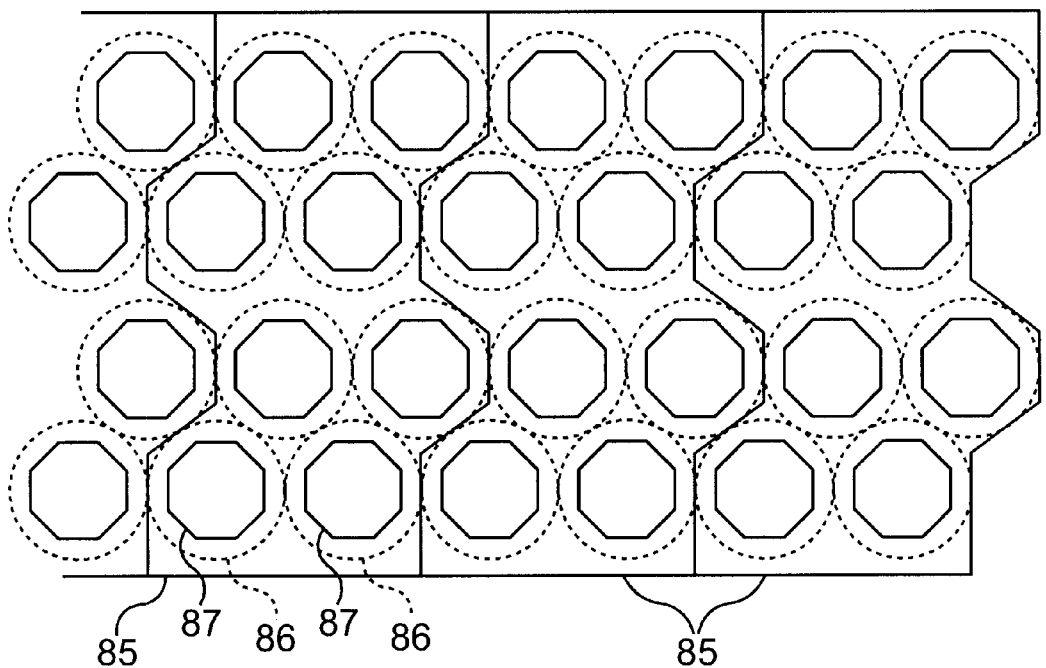
Figure 13:
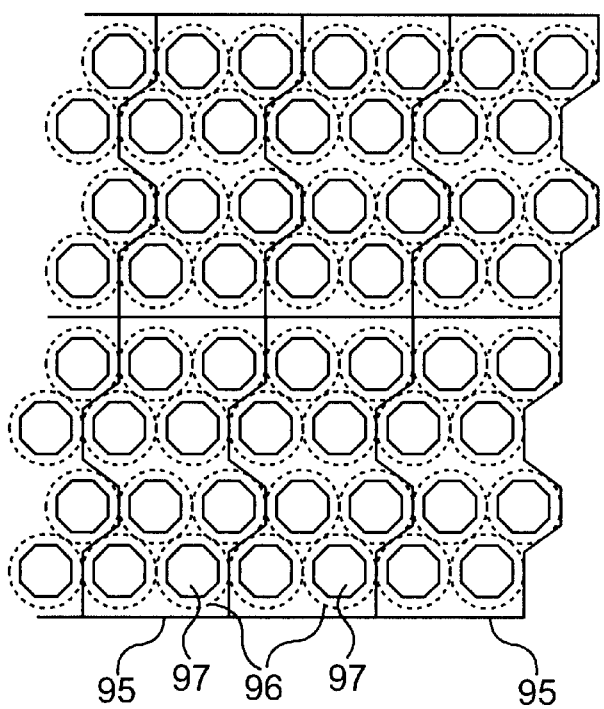
Figure 14:
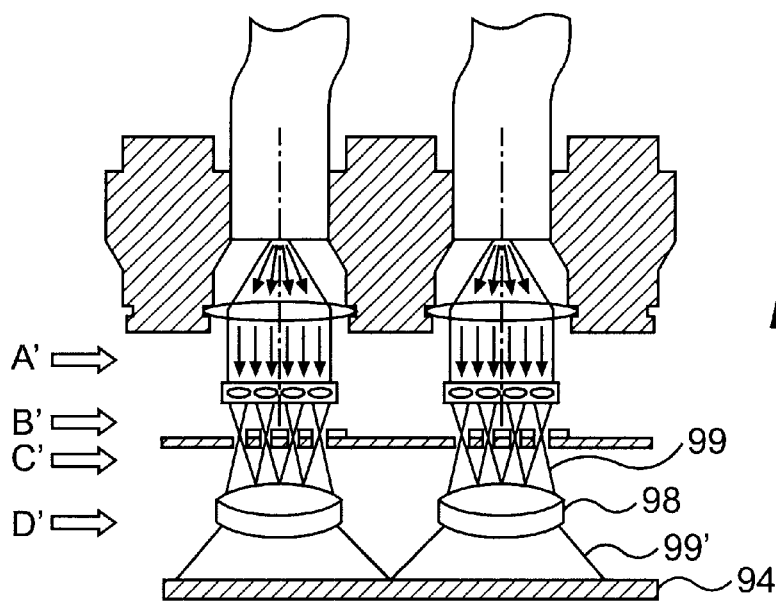
Figure 15:
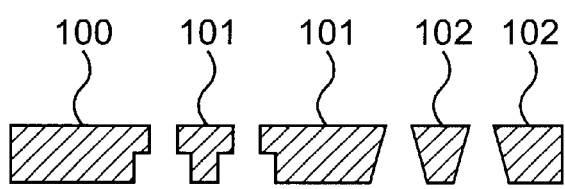

The invention will be described more fully below with reference to the drawings, in which FIG. 1 shows the invention in its basic form, FIG. 2 shows an example of how light emitters may be connected to a light source, FIG. 3 shows a further example according to the invention in which the light sources are formed by laser diodes, FIG. 4 shows a further example according to the invention in which the light emitters are formed by light guides, FIG. 5 shows the structure of a further illumination unit according to the invention, FIG. 6 shows a scanning unit according to the invention, FIGS. 7–10 illustrate the mode of operation of an illumination unit having a large number of microshutters according to the invention, FIGS. 11 and 12 show illumination modules for scanning according to the invention, FIG. 13 shows a structure of illumination modules according to the invention for flash exposure, FIG. 14 shows a cross-section of the illumination modules shown in FIG. 13, and FIG. 15 shows examples of the shape of light channels according to the invention.

EXAMPLE

FIG. 1 shows an example according to the invention.

An apparatus for point illumination of a medium 9 comprises a light emitter 1 arranged at a distance from a lens arrangement consisting of microlenses 2 and a microshutter arrangement consisting of a plate element with a plurality of apertures 6 and associated diaphragm elements 4. The diaphragm elements 4 are individually electrically activatable by displacement or rotation.

Microshutters or light valves are taken to mean transmissive light diaphragms in a broad sense, and these may e.g. be formed by micromechanical shutters. The individual shutter elements may e.g. be of the type described in French Patent Application. No. 9412928 or the corresponding EP-A 709 706, it being decisive according to the invention that the light to be modulated is transmitted directly through the individual microshutter to achieve a minimum transmission loss.

It should be noted in this connection that the microshutters described in the above-mentioned patent application may be particularly advantageous in connection with this invention, since the microshutters must (and can) have a very small rise/fall time if a reasonably well-defined spot is to be achieved on a photo-sensitive medium during mutual movement between the illumination arrangement and the medium. It should moreover be noted in this connection that according to the invention it is possible to have a relatively small illumination time on the individual illumination points because of the high transmitted light effect.

Each light valve has at least one individually addressable open and closed state, in which states minimum dimming and maximum dimming, respectively, is exhibited relatively to the passage of the light through the associated light channel.

In this connection micromechanical shutters have the advantage that the dimming in the above-mentioned two states is actually optimum, as the dimming of the light is physically provided by a micromechanical plate or the like which simply blocks light passage in the state of maximum dimming and in principle gives rise to no dimming of the light beam in the state of minimum dimming.

The function of the shown example is that a gathered collimated light beam A is focused in the apertures 6 of the microshutter arrangement so that the diaphragm elements 4 in the position shown in FIG. 1 block light passage, while, in their open state, they permit light passage through the apertures 6 so that an illumination point associated with the individual aperture 6 on the medium 9 is illuminated.

It should be noted that the present embodiment is particularly simple in its structure since no focusing optics are used between the apertures 6 and the medium 9.

This technique is described in its basic form in EP 0 642 423 B1, the medium 9 or the illumination plane being arranged precisely in the transition between the Fresnel region and the Frauenhofer region of the light beams.

It should moreover be noted that in a suitable embodiment of the microshutter arrangement the shutter plates may also be positioned on the underside of the wafer plate oriented toward the illumination face or the medium 9.

FIG. 2 shows a cross-section of a further embodiment of the invention.

An illumination system comprises a plurality of microshutter arrangements (not shown) which each are optically connected to a plurality of optical fibres 13, which are moreover optically connected to an arc-shaped absorption jacket 11, 12 which together extend 360° around the axis of a short arc lamp 10.

The optical fibres 13 are fixed on the absorption jacket so that these absorb light 360° round the lamp in an area on the absorption jacket 11, 12 between an upper angle Ua and a lower angle La.

The angles Ua and La are adapted to the concrete short arc lamp 10 used. For an Hg short arc lamp, Ua and La may e.g. be selected at +60° and −30° with respect to the equator plane E of the lamp.

The actual position and fixing of the individual fibres 13 on the absorption jackets 11, 12 with respect to the angle between these and the equator plane may likewise be selected with respect to the intensity profile of the lamp concerned.

Each optical fibre 13 may thus illuminate a subsystem, which may e.g. correspond to the one shown in FIG. 1 where the light emitting end 13 of the optical fibre corresponds to the light emitter 1.

According to an embodiment the number of optical fibres 13 around the absorption jacket 11, 12 will be about 150, which each may thus illuminate a microshutter system optically connected thereto.

According to the present embodiment each optical fibre may illuminate 5–600 light channels and thereby distribute the light from the fibre in a corresponding number of smaller light beams.

Thus, according to the invention it is possible to achieve a homogeneous illumination of the microshutters and thereby the illumination face while maintaining a good efficiency.

According to the shown embodiment of the invention the number of the necessary light guides between the light source and the illumination face is reduced by a factor of 5–600 with respect to having a separate light guide for each light channel, while maintaining a homogeneous illumination over the entire illumination face.

The fibres 13 may advantageously be distributed to the microshutter systems so that the intensity difference between two adjacent fibres does not exceed a given maximum limit, or so that two adjacent fibres, if the maximum limit is exceeded, do not lead to two adjacent microshutter arrangements.

FIG. 3 shows a further embodiment according to the invention where a laser diode is used as a light source.

Laser diodes 21 are thus positioned in a fixture 20 for illuminating a collimation lens 22, a first microlens arrangement 23, a microshutter arrangement arranged in a wafer plate 25 with light channels 26 and associated diaphragm elements 24, a second microlens arrangement 27 and finally an illumination plane 28.

It should be stressed that for clarity the shown figure does not show a typical application for e.g. image exposure, as the collimation lens 22 in such applications will typically illuminate a much larger number of microlenses and associated shutters.

The individual diaphragm elements 24 are opened and closed, i.e. modulated, in dependence on stored digital data and a possible given relative movement with respect to the illumination plane 28.

The laser diodes 21 thus emit a light beam which is collimated in the collimation lens 22 to a light beam A'. The light beam A' is subsequently conducted to the microlens arrangement 23, which focuses the light beam A' to a number of light beams B' in the light channels 26 of the microshutter arrangement, from which the light beams C' are conducted to the second microshutter arrangement 27 in which the individual beams D' are focused on the illumination plane 28 as illumination spots with a spot diameter Sd. This is not drawn to scale in the figure for clarity.

Each light emitter may illuminate 5–600 light channels in a specific application. A resolution according to the invention may e.g. be selected at 2540 DPI, i.e. 10 $\mu$m between the points.

The diameter of the collimation lens 22 is 5–10 mm, and the individual microlenses in the microlens arrangements 23 and 27 have a diameter of 2–300 $\mu$m. The centre distance between the microlenses is likewise of the order of 2–300 $\mu$m, which thereby also corresponds to the distance between the holes in the wafer plate 25. The individual light channels 26 in the wafer plate 25 typically have a smallest diameter of 20–40 $\mu$m, and the shutter plate 24 itself is slightly larger so that it can cover the hole completely. The spot diameter Sd of the illumination plane 28 may be 12–25 $\mu$m according to the present embodiment.

The on-off ratio (the ratio of how much light gets through an open shutter and a closed shutter, respectively) is of the order of 1000:1 or better, which is about 10 times better than for the best known LCD chips.

It will be appreciated that according to the invention a collimation lens may, and in some cases should, be constructed as a system of collimation lenses in order to achieve a higher efficiency.

FIG. 4 shows an embodiment which is constructed like the one shown in FIG. 3 in its basic form.

Light guides 29 are thus positioned in a fixture 20 for illuminating a collimation lens 22, a first microlens arrangement 23, a microshutter arrangement arranged in a plate 25 with light channels 26 and associated diaphragm elements 24, a second microlens arrangement 27 and finally an illumination plane 28.

It should be stressed that for clarity the shown figure does not show a typical application for e.g. image exposure, as the collimation lens 22 in such applications will typically illuminate a much larger number of microlenses and associated shutters.

The individual diaphragm elements 24 are opened and closed, i.e. modulated, in dependence on stored digital data and a possible given relative movement with the illumination plane 28.

Optical fibres 29, or light guides with adapted optical properties, emit a light beam which is collimated in the collimation lens 22 to a light beam A'. The light beam A' is subsequently conducted to the microlens arrangement 23 which focuses the light beam A' to a plurality of light beams B' in the apertures 26 of the microshutter arrangement, from which the light beams C' are conducted to the second microlens arrangement 27 where the individual beams D' are focused on the illumination plane 28 as illumination spots.

What is decisive in this application is thus that the individual microshutter groups receive light from a light source via the shown optical fibres.

As shown, it is thus possible to place the individual microshutters in primary consideration of their necessary or desired position with respect to the actual illumination of the illumination face, following which light may be conducted to the microshutter groups without any greater technical difficulties via the shown optical fibres or other forms of light guides having corresponding properties.

FIG. 5 shows an example of a microshutter architecture according to the invention, seen from above.

A scanning rod 30 for movement in the direction X comprises a number of hexagons 32 which each comprise a large number of microshutters according to the invention.

Each hexagon comprises a microshutter arrangement corresponding to those shown in FIG. 4, said microshutter arrangement comprising 400–600 light channels with associated microlens arrangement and diaphragm elements 26.

Each hexagon 32 is illuminated by an optical fibre arranged above it via a collimation lens 31 corresponding to the one shown in FIG. 4.

The subareas 34 and 38 constitute so-called zones of overlap in the longitudinal direction of the scanning rod 30, said zones of overlap being so arranged mutually that by movement of the scanning rod 30 in the direction X with suitable temporal synchronization determined by the relative rate between the scanning rod and the underlying light-sensitive medium, the individual microshutters of the scanning rod 30 may illuminate illumination points spaced equidistantly on this medium.

A projection of the illumination points of all the microshutters in the hexagons in the longitudinal direction of the scanning rod 30 will thus provide illumination points at the same distance in the entire longitudinal direction of the scanning rod 30.

A detailed section of the individual microshutters in the hexagon according to the invention illustrated above is shown in FIGS. 7–9.

FIG. 6 shows a cross-section of a scanning arrangement 40.

The overall purpose of using a scanning rod for performing the invention is to achieve a greater resolution than permitted by the dimensions of the selected microshutters and also to achieve an economically advantageous structure of the system.

The scanning arrangement 40 can perform a relative movement in the direction X relative to the substrate 41 by moving means (not shown). The scanning arrangement 40 comprises a scanning rod 30 which corresponds to the one shown in FIG. 5.

The shown scanning arrangement is capable of performing a relatively rapid scanning movement while maintaining an effective illumination with a high illumination intensity, high on/off ratio, high illumination resolution and a small rise/fall time.

Figure 7:
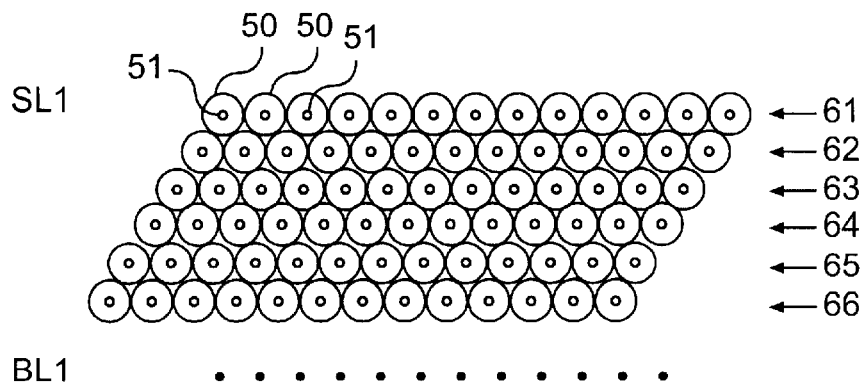
Figure 8:
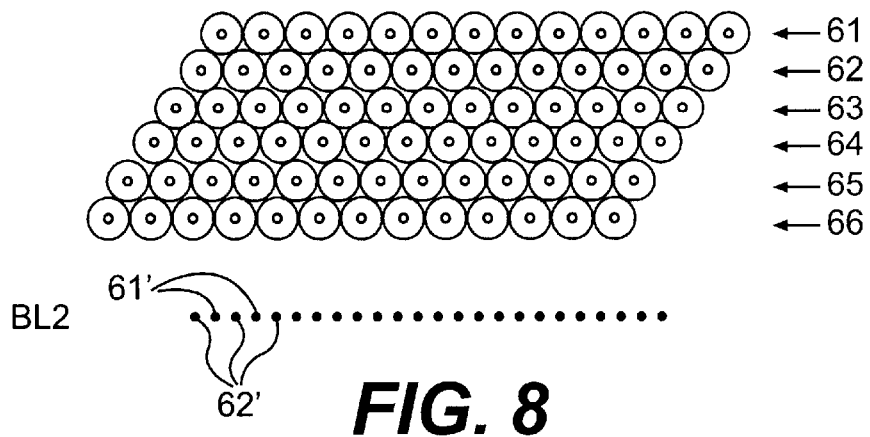

FIGS. 7–9 show a section of a microshutter arrangement according to the invention, in which the individual microshutters are arranged in a face shape of rows 61, 62, 63, 64, 65 and 66.

For clarity, only the microlens 50 associated with the individual microshutter and the light channel 51 provided in the microshutter are shown.

Each microshutter with associated optics has a maximum extent which corresponds to the centre distance between the associated microlenses 50, which, according to the illustrated example, is about 100 μm, and the light spots on the underlying photo-sensitive medium (not shown) associated with the individual microshutters are about 12–25 μm with a resolution of about 10 μm and 10 rows of shutters.

The rows 61, 62; 63, 64; 65 and 66 are mutually offset by half the effective mutual distance, while the rows 62, 63; 64, 65 are mutually offset by half the effective mutual distance plus the desired resolution.

In practice, each microshutter will typically have an extent of about 250 μm, and a larger number of rows in the microshutter array is therefore required with a resolution of about 10 μm.

It is shown in FIG. 7 how the row 61 passes a scanning line SL during movement of the scanning arrangement, which allows addressing and modulation of the scanning line in the points shown on the line BL 1.

It is shown in FIG. 8 how the row 62 passes the scanning line SL during movement of the scanning arrangement, which allows addressing and modulation on the scanning line in the points shown on the line BL 2, where the points 61' originate from the microshutter row 61 and the points 62' originate from the microshutter row 62.

It is shown in FIG. 9 how the row 63 passes the scanning line SL during movement of the scanning arrangement, which allows addressing and modulation on the scanning line in the points shown on the line BL 3, where the points 61, as shown in FIG. 8, originate from the microshutter row 61 and the points 62' originate from the microshutter row 62, and where the points 63' originate from the microshutter row 63.

It is shown in FIG. 10 how a summed image may be formed when all ten rows (of which only the rows 61–66 are shown) have passed the scanning line, with the light spots 61'–66' corresponding to the rows 61–66.

It should be stated in connection with FIGS. 7–9 that the individual microlenses associated with each shutter may e.g. be constructed as hexagonal lenses; thereby allowing light losses to be minimized by preventing light from falling outside the microlenses.

FIG. 11 shows a further example of an illumination module according to the invention.

The illumination module 80 comprises eight hexagonal faces 81 which each comprise 400–600 microshutters (not shown) according to the invention and associated optics. Each hexagon is illuminated by collimated light 82 from an optical fibre (not shown). The basic structure of the individual hexagonal faces is as shown in FIG. 4. The optical fibres are connected to an UV light source in the form of an Hg short arc lamp.

The individual illumination modules may be positioned mutually with an accuracy of about ±1 μm.

The hexagonal faces 81 cooperate mutually so that the zones of overlap together form an illumination array corresponding to the illumination array which is outside the zones of overlap.

The microshutters of the hexagonal faces 81 are electrically connected to a control unit which, on the basis of e.g. an RIP (Raster Image Processor) provides the necessary control data for the microshutters, and opens and closes the individual microshutters synchronously with the relative movement between the scanning rod and the light-sensitive medium.

The geometrical shape of the illumination modules 80 ensures that the modules 80 may be built together in a simple manner to e.g. a scanning rod having a length as desired.

Each of the shown illumination modules is illuminated by eight optical fibres (not shown) according to the present example.

The illumination modules 80 may be produced as compact modules with integrated collimation optics and optical fibres, so that the modules are ready calibrated and "ready to go" by connecting and adjusting the optical fibres with a light source in a simple manner, just as one or more electrical gates (not shown) may be connected to one overall control processor unit (not shown).

The illumination modules may e.g. be used in a scanning unit corresponding to the one shown in FIG. 6, with 24 illumination modules 80 (LSAs, Light Screen Arrays) arranged on a scanning rod, each of said illumination modules being optically connected to 8 light guides. The 192 fibres in all are connected to the same light source, e.g. a 1 kW Hg short arc mercury lamp.

The use of one long scanning rod, rather than illumination of discrete areas, results in a continuous illumination over the total cross-section of an illumination face, thereby obviating discontinuities or so-called buffer zones at boundary areas.

FIG. 12 shows a sketch of an example of an illumination module 85 according to the invention, which basically corresponds to the illumination module 80 shown in FIG. 12.

The individual illumination zones 85 may be positioned mutually with an accuracy of about ±1 μm.

The illumination modules 80, 85 may e.g. be used in an image setter of the flat bed type with a resolution of 2540 DPI.

The illumination module 85 comprises eight hexagonal faces 87 which each comprise 400–600 microshutters (not shown) according to the invention and associated optics. Each hexagonal face is illuminated by collimated light 87 from an optical fibre (not shown). The optical fibres are connected to one or more UV light sources in the form of e.g. an Hg short arc lamp.

The hexagonal faces 87 cooperate mutually so that the zones of overlap together form an illumination array corresponding to the illumination array outside the zones of overlap.

The microshutters of the hexagonal faces 87 are electrically connected to a control unit which provides the necessary control data for the microshutters on the basis of e.g. an RIP (Raster Image Processor).

The geometrical shape of the illumination modules 85 ensures that the modules may be built together in a simple manner to e.g. a scanning rod of the length that might be desired.

Additionally, the face shape shown may advantageously be used for double exposure when this might be desired, as each point may be illuminated twice in a simple manner.

Each of the shown illumination modules is illuminated by eight optical fibres (not shown).

The illumination modules 85 may also be produced as compact modules with integrated collimation optics and optical fibres, so that the modules are ready calibrated and "ready to go" by connecting the optical fibres to a light source in a simple manner, just as one or more electrical gates (not shown) may be connected to a basic control processor unit (not shown).

FIG. 13 shows a sketch of an example of an illumination module 95 according to the invention. The illumination module corresponds to the one shown in FIG. 12 in its basic shape, but with added spreading optics between the lower termination of the light channels and the illumination area.

The illumination module 95 comprises eight hexagonal faces 97 which each comprise 400–600 microshutters (not shown) according to the invention and associated optics. Each hexagonal face is illuminated by collimated light 97 from an optical fibre (not shown). The optical fibres are connected to one or more UV light sources in the form of e.g. laser diodes (not shown).

The hexagonal faces 97 cooperate mutually so that these together form an illumination array capable of illuminating the entire underlying illumination area at the same time without performing scanning. This type of flash exposure may e.g. be performed with a resolution of about 50 μm, 508 DPI and illumination spots of 50–100 μm. For flash exposure of e.g. a full A4 page, such an illumination matrix must comprise a number of 4200×5940 microshutters.

Ideally, the individual illumination modules 95 should here be positioned with a mutual accuracy corresponding to about ±1 μm on the projected image.

The microshutters of the hexagonal faces 97 are electrically connected to a control unit which provides the necessary control data for the microshutters on the basis of an RIP (Raster Image Processor).

The geometrical shape of the illumination modules 95 ensures that the modules may be built together in a simple manner to a complete illumination unit with the area extent that might be desired.

It should be noted that the light source in the example shown may be monochromatic, and each face shape may therefore be illuminated e.g. by laser diodes, as shown in FIG. 3.

It should also be noted that the layout of the individual shutter enclaves or face shapes may e.g. be square instead of hexagonal and in different sizes.

FIG. 14 shows a cross-section of the illumination modules 95 shown in FIG. 13.

The illumination modules correspond to those shown in FIG. 4 in their basic features, with the second microlens arrangement replaced by spreading optics 98 which spread the light beams C', 99 to light beams D', 99' and focus these on the illumination plate 94.

FIG. 15 shows a further example according to the invention of how the light channels may be formed. For clarity, the shown light channels are shown in the same wafer plate.

A light channel 101 may thus be formed as two subcompartments which are etched in a wafer plate 100 of glass.

Another light channel 102 may likewise be shaped as a cone in the same or another wafer plate 100.

In the embodiments shown, the shutter plate associated with the light channel may be oriented at the side of the wafer plate where the cross-section of the light channel is smallest, as light from the light emitters or the illumination source (not shown) is typically focused on the shutter plate itself in order to achieve as discrete and rapid modulation over the entire associated illumination spot as possible. If the shutter plates are positioned on the underside of the wafer plate, the light channels will thus normally have the smallest cross-section on the underside (not shown).

It will be appreciated that in some respects the shown examples are simplified for illustrative purposes. This, however, does not restrict the invention in any way to the matter described above, but exclusively serves to illustrate the overall fundamental features of the invention.

It will thus be appreciated that the invention can not only be used for the exposure of films or printing plates like in the examples shown, but may advantageously be used for the illumination of other types of light-sensitive materials in totally different applications.

What is claimed is:

1. An illumination unit for point illumination of a medium comprising at least one light emitter arranged to illuminate at least one illumination face via a microshutter arrangement, said microshutter arrangement comprising a plurality of microshutters, each microshutter comprising a light channel and an electrically activatable diaphragm device (4) associated with it, characterized in that at least one of the light emitters (1) is arranged to illuminate at least two microshutters via a first lens arrangement (2; 23), said lens arrangement comprising at least one microlens arranged with respect to each microshutter so that the light emitted by the light emitter or emitters is focused on or in the vicinity of the optical axis of the light channel (6; 26) of the individual microshutters.

2. An illumination unit for point illumination of a medium comprising at least one light emitter arranged to illuminate at least one illumination face via a microshutter arrangement, said microshutter arrangement comprising a plurality of microshutters, each microshutter comprising a light channel and an electrically activatable diaphragm device (4) associated with it, characterized in that at least one of the light emitters (1) is arranged to illuminate at least two microshutters via a first lens arrangement (2; 23), said lens arrangement comprising at least one microlens with respect to each microshutter so that the light emitted by the light emitter or emitters is focused on or in the vicinity of the optical axis of the light channel (6; 26) of the individual microshutters and said illumination unit further including a second microlens arrangement (27) arranged between the microshutters and the illumination face, so that light transmitted through the light channel (6; 26) of the individual microshutter is suitably focused on the illumination face (9; 28).

3. An illumination unit according to claim 1, characterized in that at least one of the light emitters is formed by an optical light guide (13; 29) which is optically connected to at least one light source.

4. An illumination unit according to claim 3, characterized in that the optical light guide(s) is(are) formed by optical fibres.

5. An illumination unit according to claim 1, characterized in that at least one of the light sources (10) is formed by a short arc lamp.

6. An illumination unit according to claim 1, characterized in that the light source comprises a short arc lamp (10) having light receiving optical light guides or fibres (13) which are arranged within an angle of +/−75° with respect to the equator axis (E) of the lamp on a ball face (11, 12) around the lamp, and which are optically connected to and conduct light to the light emitters.

7. An illumination unit according to claim 1, characterized in that at least one of the light sources is formed by a laser source (21).

8. An illumination unit for point illumination of a medium comprising at least light emitter arranged to illuminate at least one illumination face via a microshutter arrangement, said microshutter arrangement comprising a plurality of microshutters, each microshutter comprising a light channel and an electrically activatable diaphragm device (4) where the diaphragm device is formed by plates which are pivotally hinged to the microshutter arrangement, at least one of the light emitters (1) is arranged to illuminate at least two microshutters via a first lens arrangement (2; 23), said lens arrangement comprising at least one microlens with respect to each microshutter so that the light emitted by the light emitter or emitters is focused on or in the vicinity of the optical axis of the light channel (6; 26) of the individual microshutters.

9. An illumination unit according to claim 1, characterized in that it comprises at least one light emitter in the form of a light guide (29) optically connected to a light source and arranged to illuminate a plurality of microshutters arranged in a given face shape, at least one collimation lens (22) being arranged between the light emitter and the face shape so that collimated light is conducted toward the first microlens arrangement (2; 23) associated with the microshutters.

10. An illumination unit for point illumination of a medium comprising at least one light emitter in the form of a light guide (29) optically connected to a light source and arranged to illuminate at least one illumination face via a microshutter arrangement, said microshutter arrangement comprising a plurality of microshutters arranged in a face shape forming a hexagon, each microshutter comprising a light channel and an electrically activatable diaphragm device (4) associated with it, characterized in that at least one of the light emitters (1) via a first lens arrangement (2; 23) is arranged to illuminate the plurality of microshutters, said lens arrangement comprising at least one microlens with respect to each microshutter so that the light emitted by the light emitter or emitters is focused on or in the vicinity of the optical axis of the light channel (6; 26) of the individual microshutters and said illumination unit including at least one collimation lens (22) being arranged between the light emitter and the face shape so that collimated light is conducted toward the first microlens arrangement (2; 23) associated with the microshutters.

11. An illumination unit for point illumination of a medium, the illumination unit comprises at least eight hexagons (81; 87) which are illuminated by an optical fiber optically connected to an illumination source; at least one light emitter in the form of a light guide (29) optically connected to a light source and arranged to illuminate at least one illumination face via a microshutter arrangement, said microshutter arrangement comprising a plurality of microshutters arranged in a face shape, each microshutter comprising a light channel and an electrically activatable diaphragm device (4) associated with it, characterized in that at least one of the light emitters (1) via a first lens arrangement (2; 23) is arranged to illuminate the plurality of microshutters, said lens arrangement comprising at least one microlens with respect to each microshutter so that the light emitted by the light emitter or emitters is focused on or in the vicinity of the optical axis of the light channel (6; 26) of the individual microshutters and said illumination unit including at least one collimation lens (22) being arranged between the light emitter and the face shape so that collimated light is conducted toward the first microlens arrangement (2; 23) associated with the microshutters.

12. An illumination unit according to claim 9, characterized in that the individual microshutters with associated microlens optics are positioned in rows in the transverse direction of the face shape with the microshutters at a given mutual distance, said rows being mutually offset in the transverse direction.

13. An illumination unit according to claim 9, characterized in that the rows are arranged such that the projection of all the individual microshutters on the transverse direction in the face shape results in a plurality of illumination points at a mutual distance in the transverse direction.

14. An illumination unit for point illumination of a medium comprising at least one light emitter arranged to illuminate at least one illumination face via a microshutter arrangement, said microshutter arrangement comprising a plurality of microshutters, each microshutter comprising a light channel and an electrically activatable diaphragm device (4) associated with it, characterized in that at least one of the light emitters (1) is arranged to illuminate at least two microshutters via a first lens arrangement (2; 23) formed wholly or partly by hexagonal focal lenses, said lens arrangement comprising at least one microlens with respect to each microshutter so that the light emitted by the light emitter or emitters is focused on or in the vicinity of the optical axis of the light channel (6; 26) of the individual microshutters and said illumination unit further including a second microlens arrangement (27) formed wholly or partly by hexagonal focal lenses said second lens arrangement arranged between the microshutters and the illumination face, so that light transmitted through the light channel (6;26) of the individual microshutter is suitably focused on the illumination face (9; 28).

15. An illumination unit according to claim 1, characterized in that the face shape or shapes of the microshutters are arranged on one or more illumination heads (40), such that each illumination head (40) and the illumination face perform a mutual relative movement, said device being also provided with a control unit for controlling the microshutters in dependence on the relative movement between the illumination head and the illumination face (41).

16. An illumination unit for point illumination of a medium comprising at least one light emitter arranged to illuminate at least one illumination face via a microshutter arrangement, said microshutter arrangement comprising a plurality of microshutters arranged in a shape on one or more illumination heads (40) where each illumination head is formed by a rod (30), the relative movement between the illumination face (41) and the rod (30) being a single progressing movement in the transverse direction of the rod (30), each microshutter comprising a light channel and an electrically activatable diaphragm device (4) associated with it, characterized in that at least one of the light emitters (1) is arranged to illuminate at least two microshutters via a first lens arrangement (2; 23), said lens arrangement comprising at least one microlens with respect to each microshutter so that the light emitted by the light emitter or emitters is focused on or in the vicinity of the optical axis of the light channel (6; 26) of the individual microshutters.

17. An illumination unit for point illumination of a medium comprising at least one light emitter arranged to illuminate at least one illumination face via a microshutter arrangement, said microshutter arrangement comprising a plurality of microshutters, each microshutter comprising a light channel wherein said each microshutter is formed by an oscillating diaphragm element movable to and from between two positions said oscillating diaphragm element being suspended so that the elastic forces act toward a equilibrium position between the two positions with said illumination unit additionally comprising a control unit for controlling the oscillating diaphragm element by means of electrostatic forces such that said diaphragm element blocks the light channel of the microshutter in one of the two positions, the illumination unit characterized in that at least one of the light emitters (1) is arranged to illuminate at least two microshutters via a first lens arrangement (2; 23), said lens arrangement comprising at least one microlens with respect to each microshutter so that the light emitted by the light emitter or emitters is focused on or in the vicinity of the optical axis of the light channel (6; 26) of the individual microshutters.

18. An illumination unit for point illumination of a medium comprising at least one light emitter arranged to illuminate at least one illumination face via a microshutter arrangement, said microshutter arrangement comprising a plurality of microshutters, each microshutter comprising a light channel and an electrically activatable diaphragm device (4) associated with it, characterized in that at least one of the light emitters (1) is arranged to illuminate at least two microshutters via a first lens arrangement (2; 23), said lens arrangement comprising at least one microlens with respect to each microshutter so that the light emitted by the light emitter or emitters is focused on or in the vicinity of the optical axis of the light channel (6; 26) of the individual microshutters and said illumination unit additionally comprises optical means (98) for spreading the light beams emitted by the light channels over the illumination face.

19. A method of point illumination of a medium by means of at least one light emitter arranged to illuminate at least one illumination face via a microshutter arrangement, said microshutter arrangement comprising a plurality of microshutters, each microshutter comprising a light channel and an electrically activatable diaphragm device (4) associated with it, characterized in that at least one of the light emitters (1) is arranged to illuminate at least two microshutters via a first lens arrangement (2; 23), said lens arrangement comprising at least one microlens arranged with respect to each microshutter so that the light emitted by the light emitter or emitters is focused on or in the vicinity of the optical axis of the light channel (6; 26) of the individual microshutter.

20. A method of point illumination of a medium by means of at least one light emitter arranged to illuminate at least one illumination face via a microshutter arrangement, said microshutter arrangement comprising a plurality of microshutters, each microshutter comprising a light channel and an electrically activatable diaphragm device (4) associated with it, characterized in that at least one of the light emitters (1) is arranged to illuminate at least two microshutters via a first lens arrangement (2; 23), said lens arrangement comprising at least one microlens arranged with respect to each microshutter so that the light emitted by the light emitter or emitters is focused on or in the vicinity of the optical axis of the light channel (6; 26) of the individual microshutter and the method further including a second microlens arrangement arranged between the microshutters and the illumination face so that the light transmitted through the light channel (6; 26) of the individual microshutter is focused suitably on the illumination face (9; 28).

21. A method according to claim 19, characterized in that at least one of the light emitters is formed by an optical light guide (13; 29) which is optically connected to at least one light source.

* * * * *

UNITED STATES PATENT AND TRADEMARK OFFICE
CERTIFICATE OF CORRECTION

PATENT NO.    : 6,529,265 B1                                      Page 1 of 1
DATED         : March 4, 2003
INVENTOR(S)   : Henning Henningsen It is certified that error appears in the above-identified patent and that said Letters Patent is hereby corrected as shown below:

<u>Column 8,</u>
Line 12, after "mutual distance", insert -- $\Delta L$ --.
Line 37, "illumination. area" should read -- illumination area --.

Signed and Sealed this

Ninth Day of September, 2003

JAMES E. ROGAN
*Director of the United States Patent and Trademark Office*